(12) United States Patent
Fuller et al.

(10) Patent No.: US 9,328,850 B2
(45) Date of Patent: May 3, 2016

(54) MICROVALVE HAVING IMPROVED AIR PURGING CAPABILITY

(71) Applicant: Zhejiang DunAn Hetian Metal Co., Ltd., Zhuji, Zhejiang (CN)

(72) Inventors: Edward Nelson Fuller, Manchester, MI (US); Parthiban Arunasalam, Austin, TX (US); Chen Yang, Austin, TX (US); Mark Luckevich, Austin, TX (US); Joe Ojeda, Austin, TX (US)

(73) Assignee: Zhejiang DunAn Hetian Metal Co., LTD., Zhuji (CN)

( * ) Notice: Subject to any disclaimer, the term of this patent is extended or adjusted under 35 U.S.C. 154(b) by 66 days.

(21) Appl. No.: 14/313,147

(22) Filed: Jun. 24, 2014

(65) Prior Publication Data

US 2014/0373937 A1 Dec. 25, 2014

Related U.S. Application Data

(60) Provisional application No. 61/838,478, filed on Jun. 24, 2013.

(51) Int. Cl.
*F16K 99/00* (2006.01)

(52) U.S. Cl.
CPC ......... *F16K 99/0021* (2013.01); *F16K 99/0044* (2013.01); *F16K 99/0055* (2013.01); *F16K 99/0011* (2013.01); *F16K 2099/008* (2013.01); *Y10T 137/2213* (2015.04); *Y10T 137/2224* (2015.04); *Y10T 137/3084* (2015.04)

(58) Field of Classification Search
CPC ............ F16K 99/0001; F16K 99/0003; F16K 99/0011; F16K 99/0034; F16K 99/0036; F16K 99/038; F16K 99/0042; F16K 99/0044; F16K 2099/0073; F16K 2099/008; Y10T 137/3084; Y10T 137/2224; Y10T 137/2213; Y10T 137/2202; Y10T 137/2262

USPC ........................ 251/129.01, 11; 422/502, 503
See application file for complete search history.

(56) References Cited

U.S. PATENT DOCUMENTS

| | | | |
|---|---|---|---|
| 5,810,325 A * | 9/1998 | Carr | H02M 3/07 251/129.06 |
| 6,279,606 B1 * | 8/2001 | Hunnicutt | F15C 5/00 137/538 |
| 6,540,203 B1 * | 4/2003 | Hunnicutt | B60T 8/3695 251/129.01 |
| 6,694,998 B1 * | 2/2004 | Hunnicutt | B60T 8/3695 137/116.3 |
| 6,761,420 B2 * | 7/2004 | Maluf | B81B 3/0024 137/14 |
| 6,845,962 B1 * | 1/2005 | Barron | B60T 8/366 137/596.16 |

(Continued)

*Primary Examiner* — Mary McManmon
*Assistant Examiner* — David Colon Morales
(74) *Attorney, Agent, or Firm* — MacMillan, Sobanski & Todd, LLC

(57) ABSTRACT

A microvalve includes a base plate having a surface defining an actuator cavity. A venting groove extends from a first cavity portion of the actuator cavity having a dead end region to a second cavity portion of the actuator cavity having a structure that can vent air from the microvalve. A cover plate includes a surface having an actuator cavity provided therein that includes a first cavity portion having a dead end region and a second cavity portion having a structure that can vent air from the microvalve. An intermediate plate includes a displaceable member that is disposed within the actuator cavity for movement between a closed position, wherein the displaceable member prevents fluid communication through the microvalve, and an opened position, wherein the displaceable member does not prevent fluid communication through the microvalve.

12 Claims, 6 Drawing Sheets

(56) References Cited

U.S. PATENT DOCUMENTS

| | | | | |
|---|---|---|---|---|
| 7,011,378 B2* | 3/2006 | Maluf | .................... | B81B 3/0024 137/14 |
| 7,156,365 B2* | 1/2007 | Fuller | .................... | H02M 3/156 251/129.04 |
| 7,159,618 B2* | 1/2007 | Broyer | .................... | F15C 5/00 137/807 |
| 7,210,502 B2* | 5/2007 | Fuller | ................. | F04B 27/1804 137/596.16 |
| 7,976,795 B2* | 7/2011 | Zhou | .................... | B01L 3/5025 422/500 |
| 8,011,388 B2* | 9/2011 | Fuller | ................. | F16K 99/0001 137/625.65 |
| 8,092,664 B2* | 1/2012 | Ulmanella | .......... | B01L 3/50273 204/600 |
| 8,156,962 B2* | 4/2012 | Luckevich | .......... | F16K 99/0001 137/625.6 |
| 2006/0169339 A1* | 8/2006 | Oh | .................... | B01L 3/502738 137/827 |
| 2008/0042084 A1* | 2/2008 | Fuller | ................. | F16K 99/0001 251/26 |
| 2010/0038576 A1* | 2/2010 | Hunnicutt | .......... | F16K 99/0001 251/318 |
| 2011/0127455 A1* | 6/2011 | Hunnicutt | ........... | B81B 3/0051 251/284 |
| 2014/0374633 A1* | 12/2014 | Fuller | ................. | F16K 99/0044 251/129.06 |

\* cited by examiner

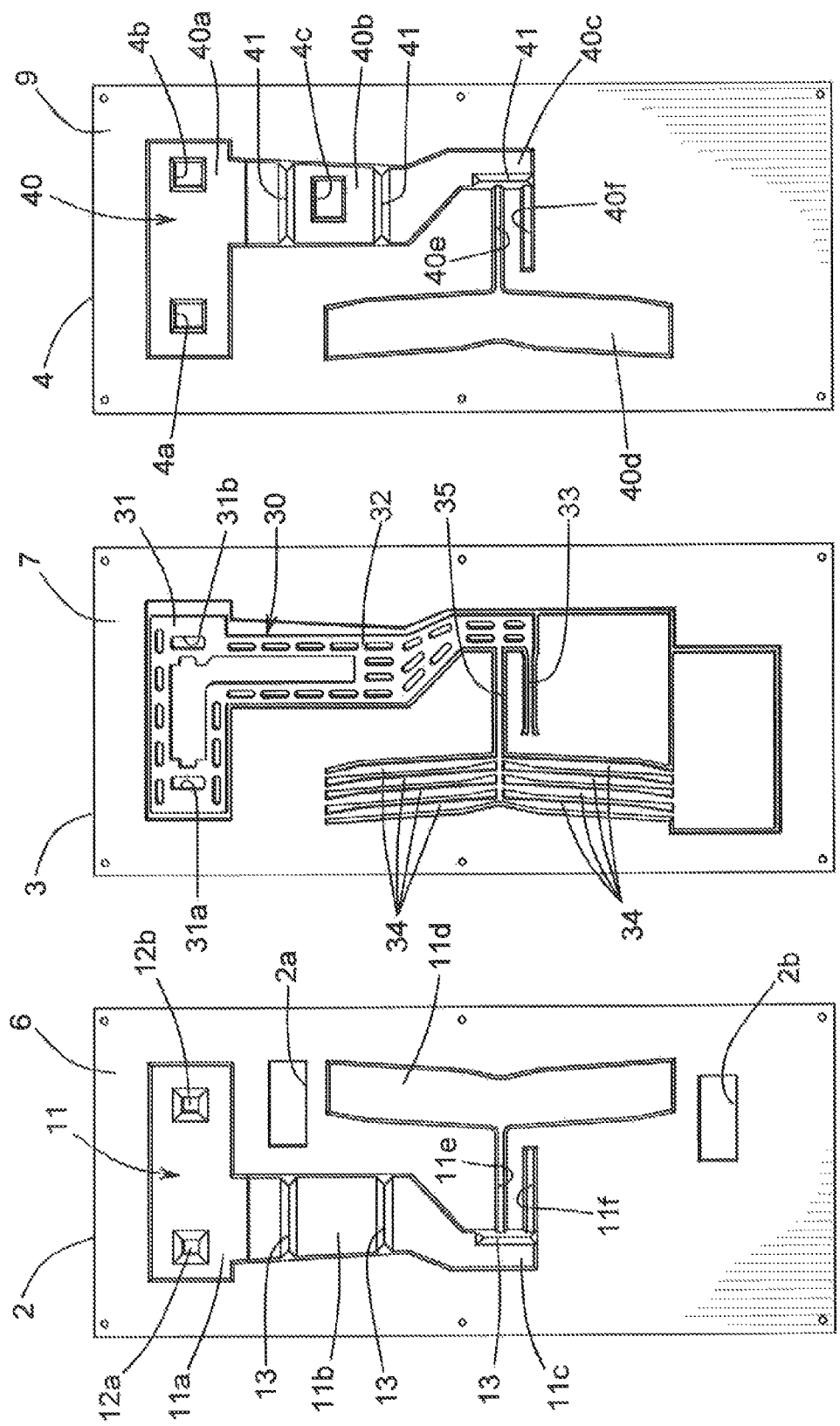

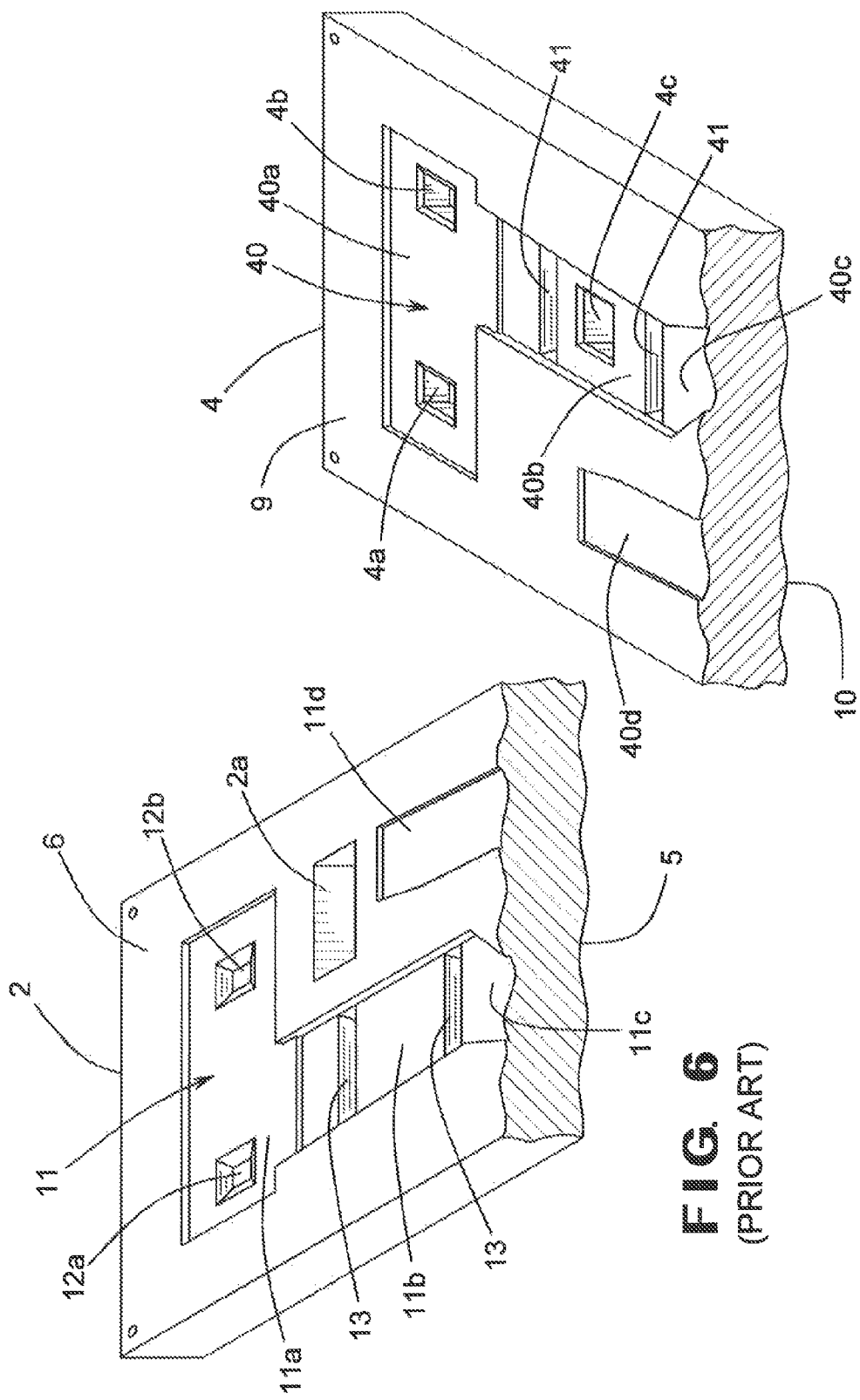

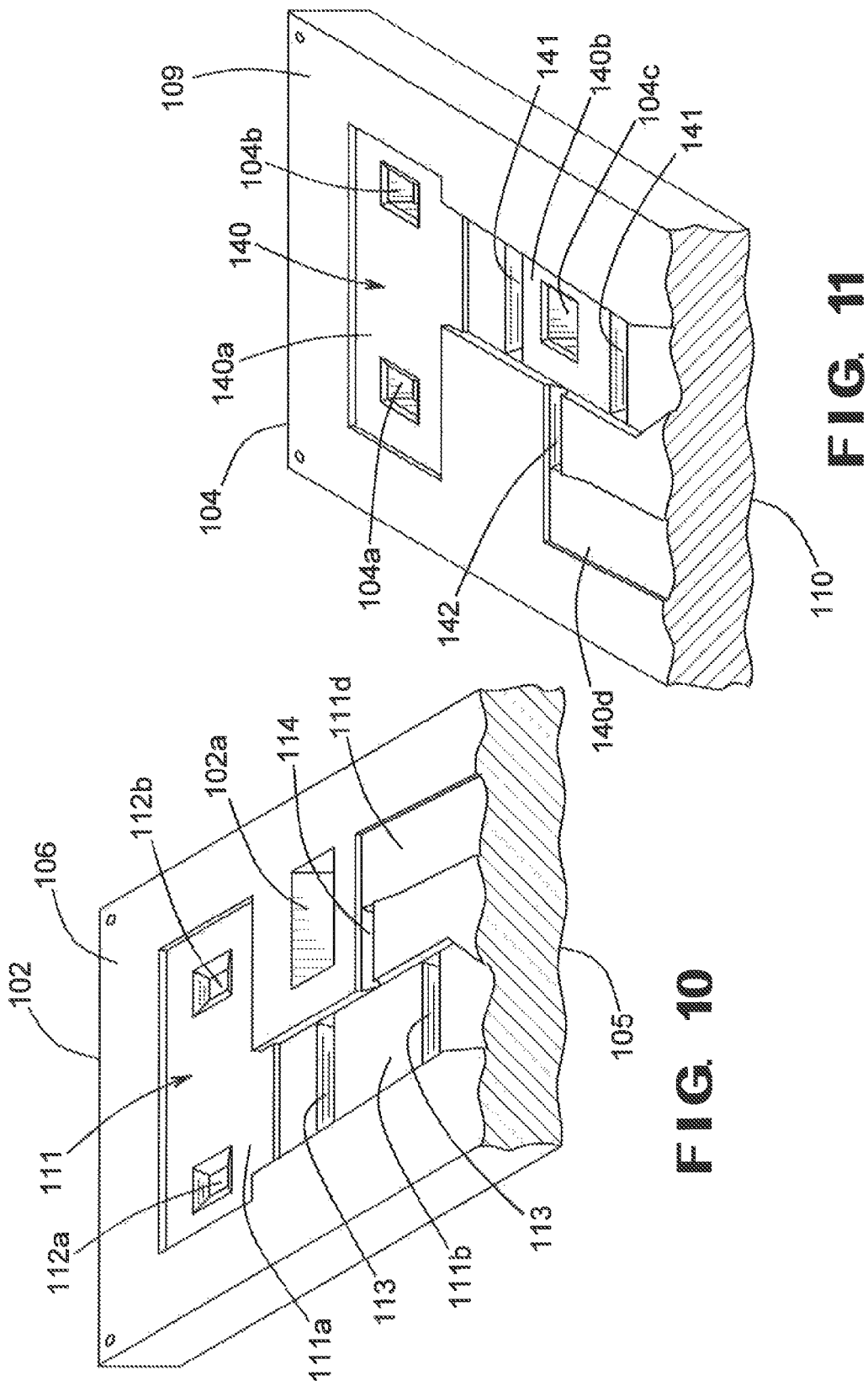

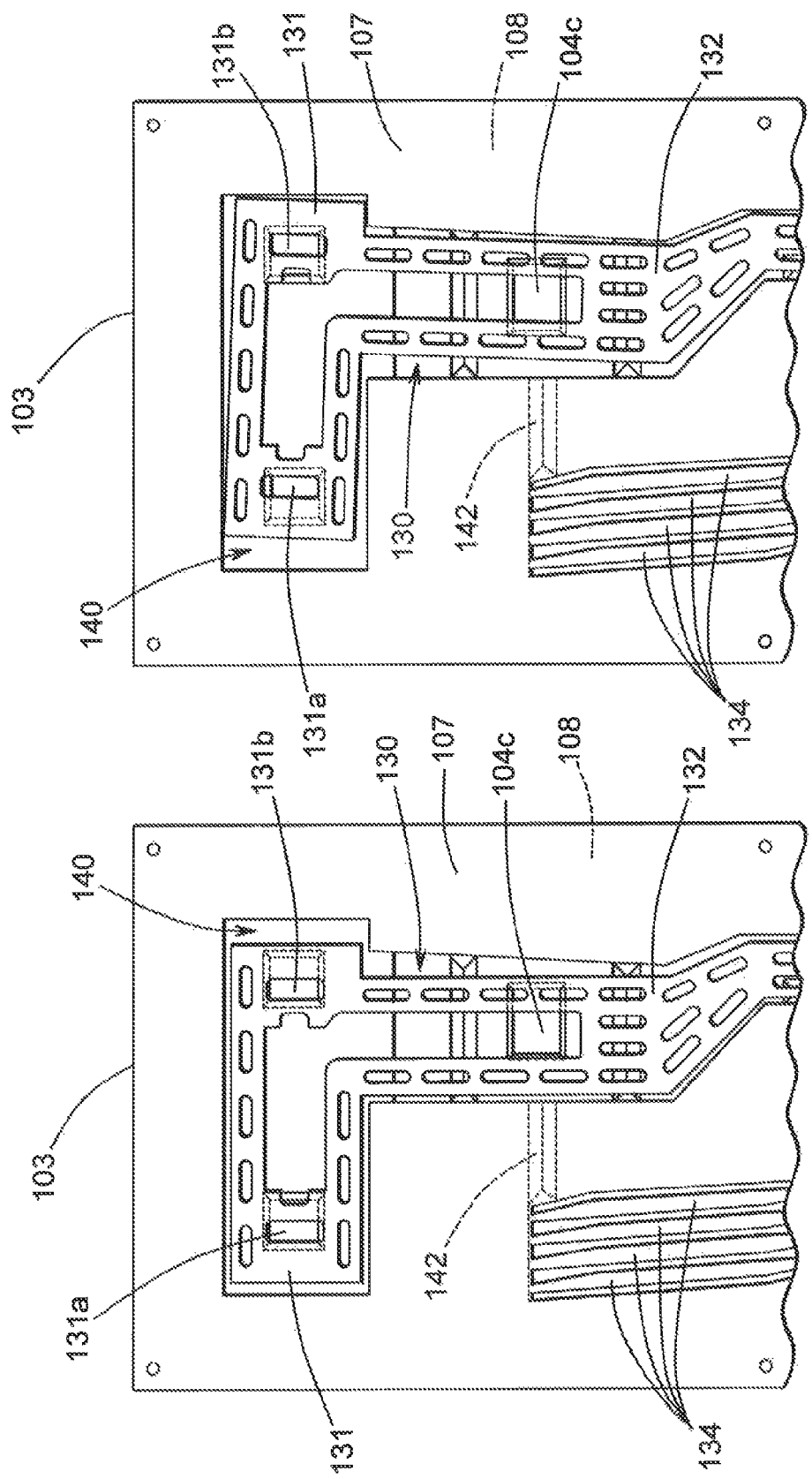

MICROVALVE HAVING IMPROVED AIR PURGING CAPABILITY

CROSS-REFERENCE TO RELATED APPLICATIONS

This application claims the benefit of U.S. Provisional Application No. 61/838,478, filed Jun. 24, 2013, the disclosure of which is incorporated herein by reference.

BACKGROUND OF THE INVENTION

This invention relates in general to microvalves for controlling the flow of fluid through a fluid circuit. In particular, this invention relates to an improved structure for such a microvalve that includes a venting structure that facilitates the purging of air that may be trapped within a portion of the microvalve and, as a result, might otherwise undesirably interfere with the operation of the microvalve.

Generally speaking, a micro-electro-mechanical system is a system that not only includes both electrical and mechanical components, but is additionally physically small, typically including features having sizes that are generally in the range of about ten micrometers or smaller. The term "micro-machining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "micro-machined device" means a device including features having sizes that are generally in the range of about ten micrometers or smaller and, thus, is at least partially formed by micro-machining. As also used herein, the term "microvalve" means a valve including features having sizes that are generally in the range of about ten micrometers or smaller and, thus, is also at least partially formed by micro-machining. Lastly, as used herein, the term "microvalve device" means a micro-machined device that includes a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened condition, the displaceable member does not substantially block the first fluid port from fluid communication with the second fluid port, thereby permitting fluid to flow between the first and second fluid ports.

In this conventional microvalve structure, it has been found that in some instances, a small quantity of air may become trapped within the microvalve. If this quantity of air is not purged from the microvalve, it may undesirably interfere with the efficient operation of the microvalve. To address this situation, it is known to cycle the microvalve rapidly between the closed and opened positions when the microvalve is initially turned on so as to purge any air may trapped within the microvalve therefrom. However, such initial cycling of the microvalve is also inefficient. Thus, it would be desirable to provide an improved structure for a microvalve that facilitates the purging of air that may be trapped within the microvalve.

SUMMARY OF THE INVENTION

This invention relates to an improved structure for a microvalve that includes a structure that facilitates the purging of air that may be trapped within the microvalve and, as a result, might otherwise undesirably interfere with the operation of the microvalve. The microvalve includes a base plate having a surface defining an actuator cavity. A venting groove extends from a first cavity portion of the actuator cavity having a dead end region to a second cavity portion of the actuator cavity having a structure that can vent air from the microvalve. A cover plate includes a surface having an actuator cavity provided therein that includes a first cavity portion having a dead end region and a second cavity portion having a structure that can vent air from the microvalve. An intermediate plate includes a displaceable member that is disposed within the actuator cavity for movement between a closed position, wherein the displaceable member prevents fluid communication through the microvalve, and an opened position, wherein the displaceable member does not prevent fluid communication through the microvalve Various aspects of this invention will become apparent to those skilled in the art from the following detailed description of the preferred embodiment, when read in light of the accompanying drawings.

BRIEF DESCRIPTION OF THE DRAWINGS

FIG. 3 is a plan view of an inner surface of a conventional cover plate for a prior art microvalve.

FIG. 4 is a plan view of a conventional intermediate plate for a prior art microvalve.

FIG. 5 is a plan view of an inner surface of a conventional base plate for a prior art microvalve.

FIG. 6 is a perspective view of a portion of the inner surface of the conventional cover plate for a prior art microvalve illustrated in FIG. 3.

FIG. 7 is a perspective view of a portion of the inner surface of the conventional base plate for a prior art microvalve illustrated in FIG. 5.

FIG. 10 is a perspective view of a portion of the inner surface of the cover plate shown in FIG. 8.

FIG. 11 is a perspective view of a portion of the inner surface of the base plate shown in FIG. 9.

FIG. 12 is a plan view of portions of the intermediate plate and the base plate illustrated in FIGS. 8 through 11 shown assembled with a displaceable member disposed in a first operating position.

FIG. 13 is a plan view of portions of the intermediate plate and the base plate illustrated in FIG. 12 shown assembled with the displaceable member disposed in a second operating position.

DETAILED DESCRIPTION OF THE PREFERRED EMBODIMENT

Figure 2:
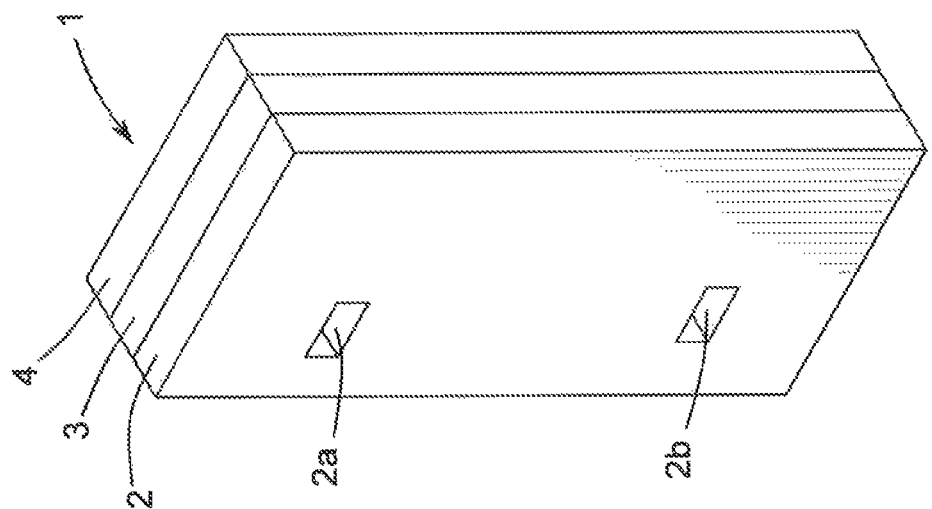
FIG. 2 is a perspective view of the basic structure of the microvalve illustrated in FIG. 1 shown assembled.
Figure 1:
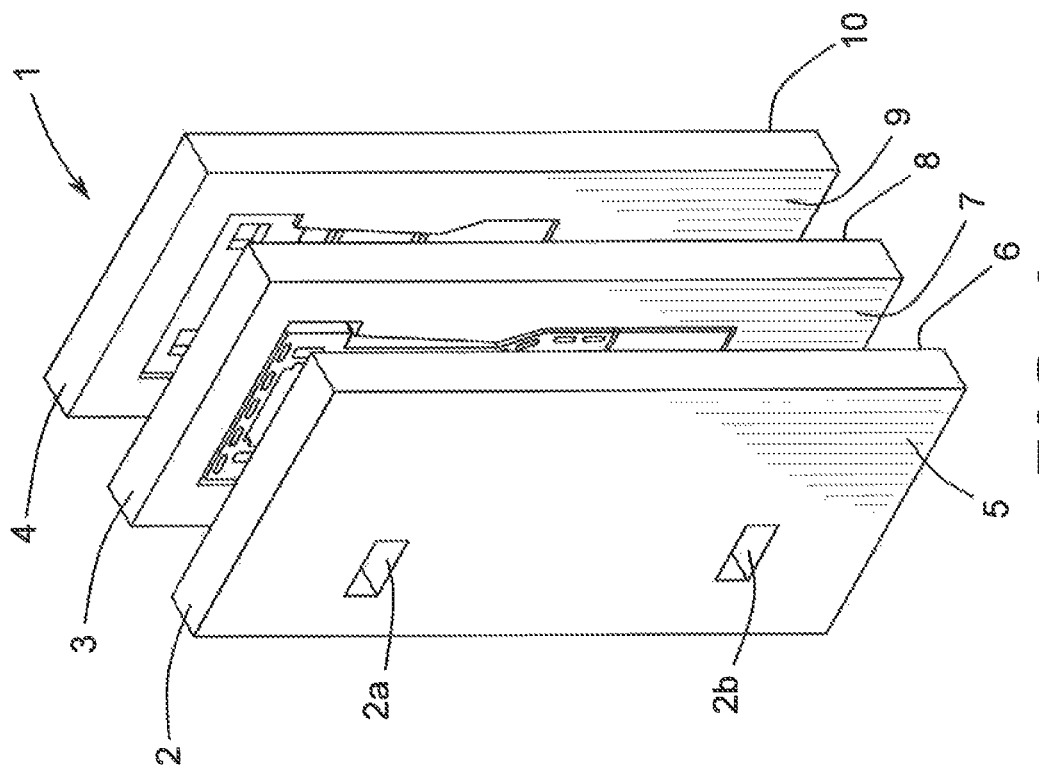
FIG. 1 is an exploded perspective view of a basic structure of a microvalve including a cover plate, an intermediate plate, and a base plate.

Referring now to the drawings, there is illustrated in FIGS. 1 and 2 a basic structure of a microvalve 1 that, to the extent shown, is representative of both a conventional structure for a microvalve and an improved structure for a microvalve in accordance with this invention. The illustrated microvalve 1 includes a cover plate 2, an intermediate plate 3, and a base plate 4. The cover plate 2 has an outer surface 5 and an inner surface 6. The cover plate 2 also has one or more openings (two of such openings 2a and 2b are shown in the illustrated embodiment) formed therethrough that, in a manner that is well known in the art, allow one or more electrically conductive wires (not shown) to pass therethrough. The intermediate plate 3 has a first surface 7 and a second surface 8. The base plate 4 has an inner surface 9 and an outer surface 10. The base plate 4 also has a one or more openings (three of such openings 4a, 4b, and 4c are shown in the illustrated embodiment) formed therethrough that, in a manner that is well known in the art, allow fluid to flow in to and out of the microvalve 1.

When the microvalve 1 is assembled as shown in FIG. 2, the inner surface 6 of the cover plate 2 engages the first surface 7 of the intermediate plate 3, and the inner surface 9 of the base plate 4 engages the second surface 8 of the intermediate plate 3. The cover plate 2, the intermediate plate 3, and the base plate 4 can be retained in this orientation in any desired manner. For example, portions of the cover plate 2 and/or the base plate 4 may be bonded to the intermediate plate 3, such as by fusion bonding, chemical bonding, or physically bonding (such as, for example, mechanical fasteners and/or adhesives). The cover plate 2, the intermediate plate 3, and the base plate 4 may be composed of any desired material or combination of materials. For example, the cover plate 2, the intermediate plate 3, and the base plate 4 may be composed of silicon and/or similar materials.

The structure of the inner surface 6 of a conventional cover plate 2 for a prior art microvalve is illustrated in detail in FIGS. 3 and 6. As shown therein, the conventional cover plate 2 includes an actuator cavity, indicated generally at 11, that is provided on the inner surface 6 thereof. The illustrated actuator cavity 11 includes an upper actuator arm cavity portion 11a, a central actuator arm cavity portion 11b, a lower actuator arm cavity portion 11c, an actuator rib cavity portion 11d, an actuator spine cavity portion 11e, and an actuator hinge cavity portion 11f. The upper actuator arm cavity portion 11a has a pair of recessed areas 12a and 12b provided therein. The illustrated actuator cavity 11 also has one or more pressure equalization depressions 13 provided therein.

The structure of a conventional intermediate plate 3 for a prior art microvalve is illustrated in detail in FIG. 4. As shown therein, the conventional intermediate plate 3 includes a displaceable member, indicated generally at 30, that includes a sealing portion 31 having a pair of openings 31a and 31b formed therethrough. The sealing portion 31 is connected through an elongated arm portion 32 to a hinge portion 33 that is formed integrally with the conventional intermediate plate 3. The intermediate plate 3 also includes an actuator including a plurality of actuator ribs 34 that is connected through a central spine 35 to the elongated arm portion 32 at a location that is intermediate of the sealing portion 31 and the hinge portion 33.

As shown in FIG. 4, first ends of a first portion of the plurality of actuator ribs 34 (the upper ribs 34 when viewing FIG. 4) are flexibly joined at first ends thereof to a first non-moving part of the intermediate plate 3. Second ends of the first portion of the plurality of actuator ribs 34 are connected to the central spine 35. The first non-moving part of the intermediate plate 3 is electrically connected to a first bond pad (not shown) that is provided on the intermediate plate 3. Similarly, first ends of a second portion of the plurality of actuator ribs 34 (the lower ribs 34 when viewing FIG. 4) are flexibly joined at first ends thereof to a second non-moving part of the intermediate plate 3. Second ends of the second portion of the plurality of actuator ribs 34 are also connected to the central spine 35. The second non-moving part of the intermediate plate 3 is electrically connected to a second bond pad (not shown) that is provided on the intermediate plate 3. The second bond pad is electrically isolated from the first bond pad, other than through the plurality of actuator ribs 34.

In a manner that is well known in the art, electrical current may be passed from the first bond pad through the plurality of actuator ribs 34 to the second bond pad. Such electrical current causes thermal expansion of the plurality of actuator ribs 34, which causes axial movement of the central spine 35. As described above, the central spine 35 is connected to the elongated arm portion 32. Consequently, axial movement of the central spine 35 causes the elongated arm portion 32 (and, therefore, the sealing portion 31) of the displaceable member 30 to pivot about the hinge portion 33 or otherwise move relative to the rest of the intermediate plate 3 (such movement occurring within a plane defined by the rest of the intermediate plate 3). Thus, the illustrated displaceable member 30 functions as a conventional micro-electro-mechanical system thermal actuator.

The structure of the inner surface 9 of a conventional base plate 4 is illustrated in detail in FIGS. 5 and 7. As shown therein, the conventional base plate 4 includes a actuator cavity, indicated generally at 40, that is provided on the inner surface 9 thereof. The illustrated actuator cavity 40 includes an upper actuator arm cavity portion 40a, a central actuator arm cavity portion 40b, a lower actuator arm cavity portion 40c, an actuator rib cavity portion 40d, an actuator spine cavity portion 40e, and a hinge cavity portion 40f. The illustrated actuator cavity 40 also has one or more pressure equalization depressions 41 provided therein.

FIGS. 8 through 13 illustrate portions of an improved microvalve in accordance with this invention. As mentioned above, the basic structure of the microvalve of this invention is similar to that shown in FIGS. 1 and 2 and, therefore, includes a cover plate 102, an intermediate plate 103, and a base plate 104. The cover plate 102 has an outer surface 105 and an inner surface 106. The cover plate 102 also has one or more openings (two of such openings 102a and 102b are shown in the illustrated embodiment) formed therethrough that, in a manner that is well known in the art, allow one or more electrically conductive wires (not shown) to pass therethrough. The intermediate plate 103 has a first surface 107 and a second surface 108. The base plate 104 has an inner surface 109 and an outer surface 110. The base plate 104 also has one or more openings (three of such openings 104a, 104b, and 104c are shown in the illustrated embodiment) formed therethrough that, in a manner that is well known in the art, allow fluid to flow in to and out of the microvalve.

When the microvalve is assembled, the inner surface 106 of the cover plate 102 engages the first surface 107 of the intermediate plate 103, and the inner surface 109 of the base plate 104 engages the second surface 108 of the intermediate plate 103. The cover plate 102, the intermediate plate 103, and the base plate 104 can be retained in this orientation in any desired manner. For example, portions of the cover plate 102 and/or the base plate 104 may be bonded to the intermediate plate 103, such as by fusion bonding, chemical bonding, or physically bonding (such as, for example, mechanical fasteners and/or adhesives). The cover plate 102, the intermediate plate 103, and the base plate 104 may be composed of any desired material or combination of materials. For example, the cover plate 102, the intermediate plate 103, and the base plate 104 may be composed of silicon and/or similar materials.

Figure 8:
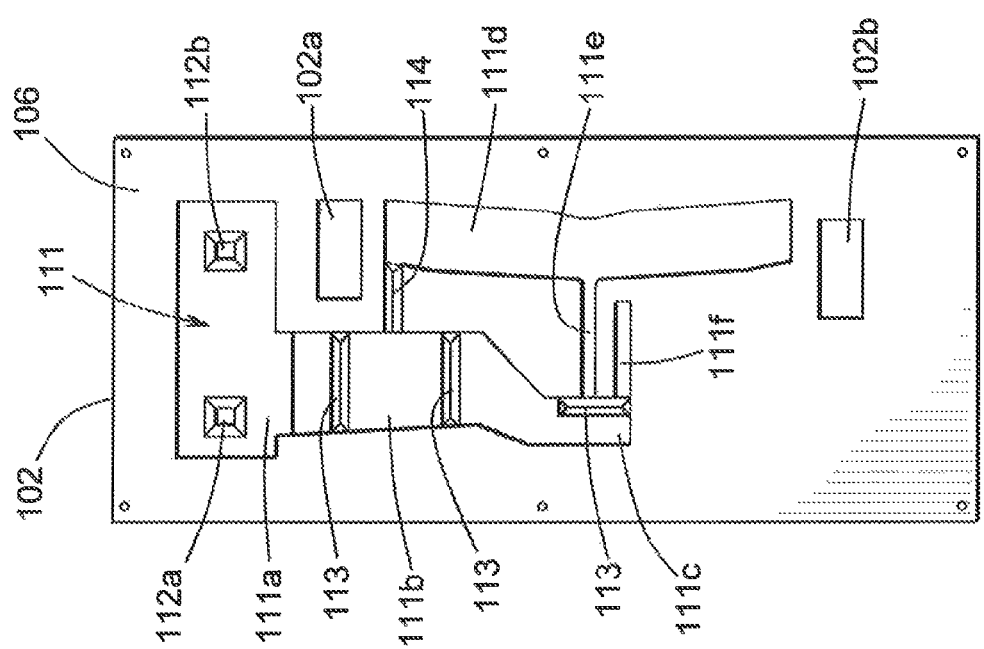
FIG. 8 is a plan view of an inner surface of a cover plate for an improved microvalve in accordance with this invention.

The structure of the inner surface 106 of the cover plate 102 of this invention is illustrated in detail in FIGS. 8 and 10. As shown therein, the cover plate 102 of this invention includes an actuator cavity, indicated generally at 111, that is provided on the inner surface 106 thereof. The illustrated actuator cavity 111 includes an upper actuator arm cavity portion 111a, a central actuator arm cavity portion 111b, a lower actuator arm cavity portion 111c, a longitudinally extending actuator rib cavity portion 111d, as shown in FIG. 8, an actuator spine cavity portion 111e, and a hinge cavity portion 111f. The upper actuator arm cavity portion 111a has a pair of recessed areas 112a and 112b provided therein. As shown in FIG. 8, the longitudinally extending actuator rib cavity portion 111d has a first longitudinally extending side wall, a second longitudinally extending side wall, a first end wall extending transversely between the first and second longitudinally extending side walls, and a second end wall extending transversely between the first and second longitudinally extending side walls. The actuator rib cavity portion 111d thus has a first longitudinal end bounded in part by the first end wall and the first and second longitudinally extending side walls, and a second longitudinal end opposite the first longitudinal end and bounded in part by the second end wall and the first and second longitudinally extending side walls. When viewing FIG. 8, the first longitudinal end is nearest the upper actuator arm cavity portion 111a. The first longitudinal end further defines a dead end region of the actuator rib cavity portion 111d. The illustrated actuator cavity 111 also has one or more pressure equalization depressions 113 provided therein.

Unlike the prior art cover plate 2, however, the cover plate 102 of this invention has an air purging groove 114 or other venting structure provided therein that extends from the actuator rib cavity portion 111d of the actuator cavity 111 to the central actuator arm cavity portion 111b of the actuator cavity 111. In the illustrated embodiment, this air purging groove 114 extends from what is commonly referred to as the dead end region at the first longitudinal end of the actuator rib cavity portion 111d (i.e., an end of the actuator rib cavity portion 111d that is not directly vented to or otherwise in fluid communication with a fluid port, such as one of the openings 104a, 104b, and 104c) to the central actuator arm cavity portion 111b of the actuator cavity 111. The ends of the illustrated air purging groove 114 terminate at respective edges of the actuator rib cavity portion 111d and the actuator arm cavity portion 111b of the actuator cavity 111. However, if desired, either or both of the ends of the illustrated air purging groove 114 may extend past such respective edges into the main portions of the actuator rib cavity portion 111d and the actuator arm cavity portion 111b of the actuator cavity 111. Also, plural air purging groove 114 may be provided if desired. As will be explained in greater detail below, the air purging groove 114 is provided to facilitate the purging of air that may be trapped within the dead end region of the actuator rib cavity portion 111d of the microvalve and, as a result, might otherwise undesirably interfere with the operation of the microvalve.

The structure of the intermediate plate 103 of this invention can be the same as described above in connection with the intermediate plate 3. Thus, as shown in FIGS. 10, 12, and 13, the intermediate plate 103 of this invention includes a displaceable member, indicated generally at 130, that includes a sealing portion 131 having a pair of openings 131a and 131b formed therethrough. The sealing portion 131 is connected through an elongated arm portion 132 to a hinge portion (not shown) that is formed integrally with the intermediate plate 103 of this invention. The displaceable member 130 also includes a plurality of actuator ribs 134 that is connected through a central spine (not shown) to the elongated arm portion 132 at a location that is intermediate of the sealing portion 131 and the hinge portion.

As shown in FIGS. 12 and 13, first ends of a first portion of the plurality of actuator ribs 134 (the upper ribs 134 shown in FIGS. 12 and 13) are flexibly joined at first ends thereof to a first non-moving part of the intermediate plate 103 of this invention. Second ends (not shown) of the first portion of the plurality of actuator ribs 134 are connected to the central spine. The first non-moving part of the intermediate plate 103 of this invention is electrically connected to a first bond pad (not shown) provided on the intermediate plate 103. Similarly, first ends of a second portion of the plurality of actuator ribs 134 (not shown) are flexibly joined at first ends thereof to a second non-moving part of the intermediate plate 103 of this invention. Second ends (not shown) of the second portion of the plurality of actuator ribs 134 are also connected to the central spine. The second non-moving part of the intermediate plate 103 of this invention is electrically connected to a second bond pad (not shown) provided on the intermediate plate 103. The second bond pad is electrically isolated from the first bond pad, other than through the plurality of actuator ribs 134.

In a manner that is well known in the art, electrical current may be passed from the first bond pad through the plurality of actuator ribs 134 to the second bond pad. Such electrical current causes thermal expansion of the plurality of actuator ribs 134, which causes axial movement of the central spine. As described above, the central spine is connected to the elongated arm portion 132. Consequently, axial movement of the central spine causes the elongated arm portion 132 (and, therefore, the sealing portion 131) of the displaceable member 130 to pivot about the hinge portion or otherwise move relative to the rest of the intermediate plate 103 (such movement occurring within a plane defined by the rest of the intermediate plate 103). Thus, the illustrated displaceable member 130 functions as a conventional micro-electro-mechanical system thermal actuator.

Figure 9:
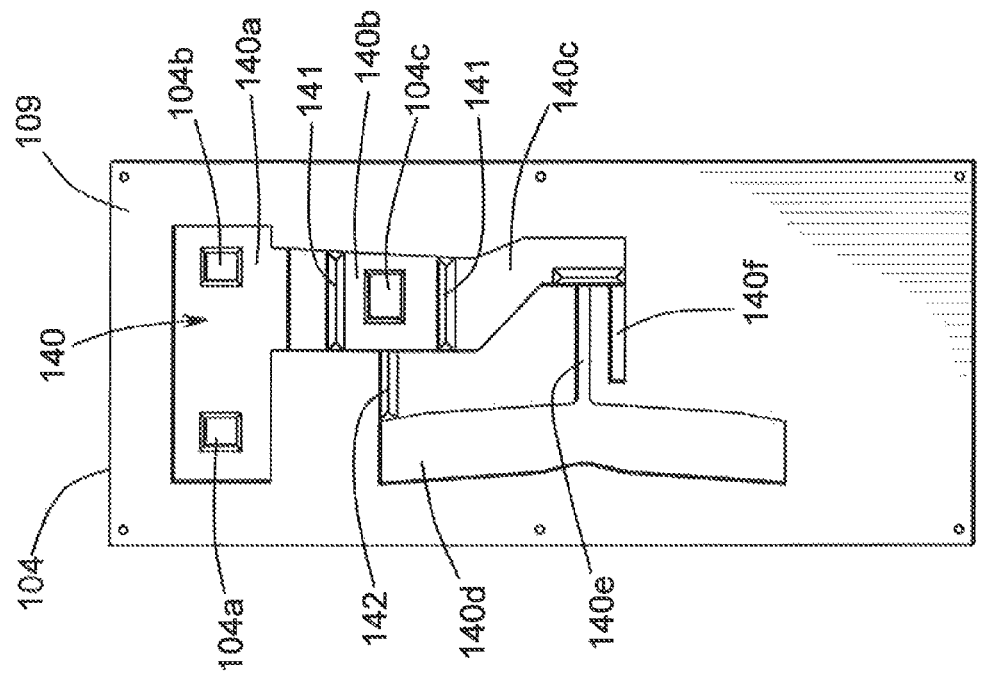
FIG. 9 is a plan view of an inner surface of a base plate for the microvalve of this invention.

The structure of the inner surface 109 of the base plate 104 of this invention is illustrated in detail in FIGS. 9 and 11. As shown therein, the base plate 104 of this invention includes an actuator cavity, indicated generally at 140, that is provided on the inner surface 109 thereof. The illustrated actuator cavity 140 includes an upper actuator arm cavity portion 140a, a central actuator arm cavity portion 140b, a lower actuator arm cavity portion 140c, an actuator rib cavity portion 140d, an actuator spine cavity portion 140e, and a hinge cavity portion 140f. The illustrated actuator cavity 140 also has one or more pressure equalization depressions 141 provided therein.

Unlike the prior art base plate 4, however, the base plate 104 of this invention has an air purging groove or other venting structure 142 provided therein that extends from the actuator rib cavity portion 140d of the actuator cavity 140 to the central actuator arm cavity portion 140b of the actuator cavity 140. As with the air purging groove 114 described above, this air purging groove 142 extends from the dead end region of the actuator rib cavity portion 140d to the central actuator arm cavity portion 140b of the actuator cavity 140. The ends of the illustrated air purging groove 142 terminate at respective edges of the actuator rib cavity portion 140d and the actuator arm cavity portion 140b of the actuator cavity 140. However, if desired, either or both of the ends of the illustrated air purging groove 142 may extend past such respective edges into the main portions of the actuator rib cavity portion 140d and the actuator arm cavity portion 140b of the actuator cavity 140. Also, plural air purging groove 142 may be provided if desired. As will be explained in greater detail below, the air purging groove 142 is provided to facilitate the purging of air that may be trapped within the dead end region of the actuator rib cavity portion 140d of the microvalve and, as a result, might otherwise undesirably interfere with the operation of the microvalve.

The actuator cavity 114 provided in the cover plate 102 and the actuator cavity 140 provided in the base plate 104 cooperate with fixed portions of the intermediate plate 103 to define a closed internal cavity within which the displaceable member 130 is supported for movement between the closed position (illustrated in FIG. 12) and the opened position (illustrated in FIG. 13). As is well known, this closed internal cavity also contains fluid that has leaked from the normal flow path of such fluid through the microvalve. This leakage is normal in microvalves of this general type, but can result in the accumulation of air within portions of the closed internal cavity that are not closely located to a structure (such as one of the openings 104a, 104b, and 104c) where such air can be vented from the microvalve. As mentioned above, the presence of air within the microvalve may, in some instances, undesirably interfere with the operation of the microvalve.

To address this, the air purging groove 114 in the cover plate 102 provides a direct venting path for any air that may be trapped within the dead end region of the actuator rib cavity portion 111d to the central actuator arm cavity portion 111b of the actuator cavity 111. From there, such air is easily vented through the opening 104c to the exterior of the microvalve. Similarly, the air purging groove 142 in the base plate 104 provides a direct venting path for any air that may be trapped within the dead end region of the actuator rib cavity portion 140d to the central actuator arm cavity portion 140b of the actuator cavity 140. From there, such air is also easily vented through the opening 104c to the exterior of the microvalve. Although the illustrated microvalve is provided with air purging grooves 114 and 142 in both the cover plate 102 and the base plate 104, respectively, it is contemplated that only a single one of the air purging grooves 114 and 142 be provided.

The embodiment of the microvalve of this invention illustrated in FIGS. 8 through 13 is packaged in a conventional U-flow configuration, wherein the first and second openings 104a and 104c (which define the inlet and outlet to the flow of fluid through the microvalve) are located on the same side (the base plate 104 side) of the microvalve. However, this invention can be used with an alternative embodiment of the microvalve, wherein the microvalve is packaged in a conventional through flow configuration (not shown). In this alternative embodiment, openings (which define the inlets and outlet to the flow of fluid through the microvalve) are located on opposite sides (on the cover plate and the base plate sides) of the microvalve. The structure and manner of operation of this alternative embodiment of the microvalve is otherwise similar to the first embodiment of the microvalve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A microvalve comprising:
a first plate including a surface having an actuator cavity provided therein that includes a longitudinally extending first cavity portion having a first longitudinal end and a second longitudinal end opposite the first longitudinal end, the first longitudinal end defining a dead end region, a second cavity portion having a structure that can vent air from the microvalve, and a vent structure that extends from the dead end region of the first cavity portion to the second cavity portion; and
a second plate having a surface that abuts the surface of the first plate and includes a displaceable member that is disposed within the actuator cavity for movement between a closed position, wherein the displaceable member prevents fluid communication through the microvalve, and an opened position, wherein the displaceable member does not prevent fluid communication through the microvalve.

2. The microvalve defined in claim 1 wherein:
the actuator cavity includes an upper actuator arm cavity portion, a central actuator arm cavity portion, a lower actuator arm cavity portion, an actuator rib cavity portion, an actuator spine cavity portion, and a hinge cavity portion; and wherein
the displaceable member includes a sealing portion that is disposed in the upper actuator arm cavity portion, an elongated arm portion that is disposed in the central actuator arm cavity portion, a hinge portion that is disposed in the hinge cavity portion, a plurality of actuator ribs that is disposed in the actuator spine cavity portion, and a central spine that connects the plurality of actuator ribs to the elongated arm portion.

3. The microvalve defined in claim 1 wherein the vent structure is a groove that is provided in the surface of the first plate.

4. The microvalve defined in claim 1 further including:
a third plate including a surface having an actuator cavity provided therein that includes a longitudinally extending first cavity portion having a dead end region and a second cavity portion having a structure that can vent air from the microvalve; and
wherein
the displaceable member is also disposed within the actuator cavity of the third plate for movement between the closed and opened positions.

5. The microvalve defined in claim 4 wherein the first cavity portion includes a first longitudinal end and a second longitudinal end opposite the first longitudinal end, and wherein the first longitudinal end defines the dead end region.

6. The microvalve defined in claim 5 wherein the third plate includes a vent structure that extends from the dead end region of the first cavity portion of the third plate to the second cavity portion of the third plate.

7. The microvalve defined in claim 6 wherein the vent structure of the third plate is a groove that is provided in the surface of the third plate.

8. A microvalve comprising:
a base plate including a surface having an actuator cavity provided therein that includes a longitudinally extending first cavity portion having a first longitudinal end and a second longitudinal end opposite the first longitudinal end, the first longitudinal end defining a dead end region, a second cavity portion having a structure that can vent air from the microvalve, and a vent structure that extends from the dead end region of the first cavity portion to the second cavity portion;

a cover plate including a surface having an actuator cavity provided therein that includes a longitudinally extending first cavity portion having a first longitudinal end and a second longitudinal end opposite the first longitudinal end, the first longitudinal end defining a dead end region, a second cavity portion having a structure that can vent air from the microvalve, and a vent structure that extends from the dead end region of the first cavity portion to the second cavity portion; and an intermediate plate having a first surface that abuts the surface of the base plate and a second surface that abuts the surface of the cover plate, the intermediate plate including a displaceable member that is disposed within the actuator cavities of both the base plate and the cover plate for movement between a closed position, wherein the displaceable member prevents fluid communication through the microvalve, and an opened position, wherein the displaceable member does not prevent fluid communication through the microvalve.

9. The microvalve defined in claim 8 wherein:
each of the actuator cavities of the base plate and the cover plate includes an upper actuator arm cavity portion, a central actuator arm cavity portion, a lower actuator arm cavity portion, an actuator rib cavity portion, an actuator spine cavity portion, and a hinge cavity portion; and wherein the displaceable member includes a sealing portion that is disposed in each of the upper actuator arm cavity portions, an elongated arm portion that is disposed in each of the central actuator arm cavity portions, a hinge portion that is disposed in each of the hinge cavity portions, a plurality of actuator ribs that is disposed in each of the actuator spine cavity portions, and a central spine that connects the plurality of actuator ribs to the elongated arm portion.

10. The microvalve defined in claim 8 wherein the vent structure of the base plate is a groove that is provided in the surface of the base plate.

11. The microvalve defined in claim 8 wherein the vent structure of the cover plate is a groove that is provided in the surface of the cover plate.

12. The microvalve defined in claim 8 wherein the vent structure of the base plate is a groove that is provided in the surface of the base plate, and the vent structure of the cover plate is a groove that is provided in the surface of the cover plate.

* * * * *